(12) United States Patent
Parlour

(10) Patent No.: US 7,437,582 B1
(45) Date of Patent: Oct. 14, 2008

(54) POWER CONTROL IN A DATA FLOW PROCESSING ARCHITECTURE

(75) Inventor: David B. Parlour, Pittsburgh, PA (US)

(73) Assignee: Xilinx, Inc., San Jose, CA (US)

(*) Notice: Subject to any disclaimer, the term of this patent is extended or adjusted under 35 U.S.C. 154(b) by 484 days.

(21) Appl. No.: 11/200,685

(22) Filed: Aug. 10, 2005

(51) Int. Cl.
G06F 1/10 (2006.01)
G06F 1/26 (2006.01)
G06F 1/32 (2006.01)

(52) U.S. Cl. .................. 713/320; 713/100; 713/300; 345/100; 327/530

(58) Field of Classification Search ............... 713/1, 713/100, 300, 320; 345/98, 100; 327/530
See application file for complete search history.

(56) References Cited

U.S. PATENT DOCUMENTS

| | | | |
|---|---|---|---|
| 5,367,638 A | 11/1994 | Niessen et al. | |
| 5,574,634 A | 11/1996 | Parlour et al. | |
| 5,751,164 A | 5/1998 | Sharpe-Geisler et al. | |
| 6,157,361 A * | 12/2000 | Kubota et al. | ............... 345/100 |
| 6,647,502 B1 | 11/2003 | Ohmori | |
| 2003/0020520 A1* | 1/2003 | Miyake et al. | ............... 327/112 |
| 2003/0174115 A1* | 9/2003 | Washio et al. | .................. 345/98 |
| 2004/0080358 A1* | 4/2004 | Kushnarenko | .............. 327/530 |

OTHER PUBLICATIONS

Prayati, Aggeliki et al., "Task concurrencey management experiment for power-efficient speed-up of embedded MPEG4 player," *Proceedings of the 2000 International Workshops on Parallel Processing*, Aug. 21-24, 2000, pp. 453-460, Toronto, Ontario, Canada.
Lee, Edward A. et al., "Dataflow Process Networks," *Proceedings of the IEEE*, May 1995, pp. 773-799, vol. 83, No. 5.

* cited by examiner

*Primary Examiner*—Rehana Perveen
*Assistant Examiner*—Fahmida Rahman
(74) *Attorney, Agent, or Firm*—W. Eric Webostad; Michael R. Hardaway

(57) ABSTRACT

Method and system for dynamically adjusting performance of circuitry blocks are described. A first circuit domain is coupled to an interim storage device. The first circuit domain includes a first level shifter coupled to an input of a first circuitry block and a second level shifter coupled to an output of the first circuitry block. The second level shifter is coupled between the output of the first circuitry block and an input of the interim storage device. A controller is coupled to the first circuit domain for adjustment of a first operating voltage of the first circuit domain.

16 Claims, 3 Drawing Sheets

POWER CONTROL IN A DATA FLOW PROCESSING ARCHITECTURE

FIELD OF THE INVENTION

One or more aspects of the invention relate generally to integrated circuits and, more particularly, to a data flow processing architecture for dynamic performance adjustment to controllably increase or decrease power consumption.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

Heretofore, performance of a design instantiated in programmably configurable circuitry of an FPGA ("FPGA fabric") was limited to fixed power levels or clock frequencies. However, these fixed power levels or clock frequencies conventionally were targeted for peak performance. In many applications, data processing load, either average or instantaneous, is data dependent. If the amount of processing performance or power for processing of each type of data according to an associated function is fixed, such performance associated with processing functions is conventionally provisioned to handle a worst case over an entire range of data sequences. Thus, data sequences which may be processed at less than peak performance were processed at peak levels in such performance fixed systems.

This means that for many data sequences, excess power is consumed by processing data faster than is needed by an application. As is known, power dissipation into a capacitive load increases correspondingly to switching activity. Furthermore, regardless of the number of signals which are being switched or the rate at which signals are being switched, in some technologies, such as CMOS for example, power may be consumed even when no signals are switching, due to leakage current. This type of static power consumption increases with increasing supply voltage.

Accordingly, it would be desirable to reduce power consumption in instances when less than peak performance may be employed by reducing at least one of operating voltage or frequency of operation while meeting throughput needs of an application.

SUMMARY OF THE INVENTION

One or more aspects of the invention generally relate to integrated circuits and, more particularly, to a data flow processing architecture for dynamic performance adjustment to controllably increase or decrease power consumption. An aspect of the invention is a system for dynamically adjusting performance of circuitry blocks. A first circuit domain is coupled to an interim storage device. The first circuit domain includes a first level shifter coupled to an input of a first circuitry block and a second level shifter coupled to an output of the first circuitry block. The second level shifter is coupled between the output of the first circuitry block and an input of the interim storage device. A controller is coupled to the first circuit domain for adjustment of a first operating voltage of the first circuit domain.

Another aspect of the invention is a method for dynamically adjusting performance of a system including circuit modules. The circuit modules are serially coupled with level shifters and buffer memories to provide a buffered chain of modules. The buffer memories include an input buffer memory coupled to one end of the buffered chain of modules and an output buffer memory coupled to another end of the buffered chain of modules. Supply voltage level of data to, from, and for each circuit module of the circuit modules is set responsive to fullness state of a portion of the buffer memories associated with the circuit module. Frequency of operation of the portion of the buffer memories and the circuit module is set responsive to the fullness state of the portion of the buffer memories.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
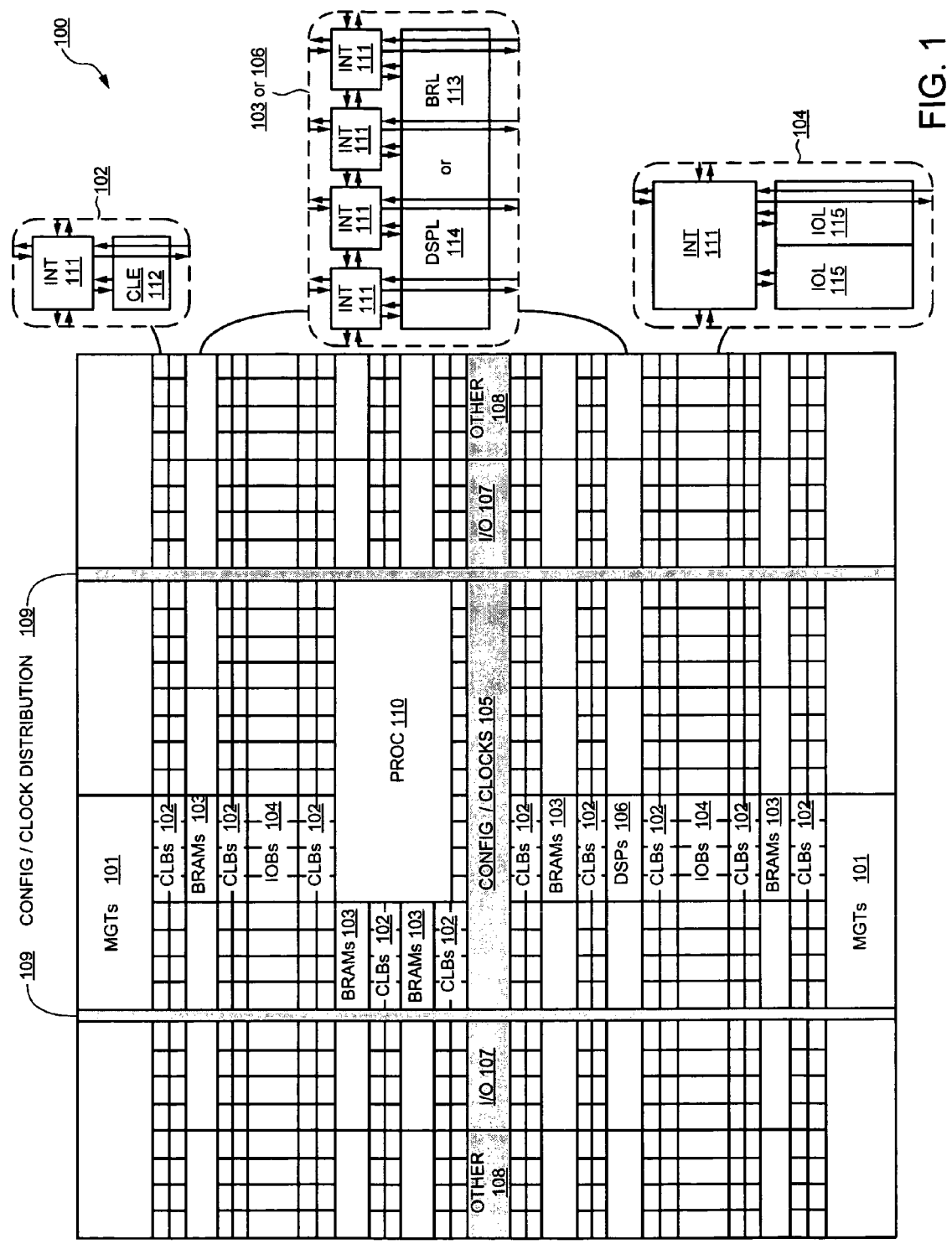
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110. FPGA 100 may be used to implement data processing architecture 200 of FIG. 2.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ FPGA from Xilinx of San Jose, Calif.

Figure 2:
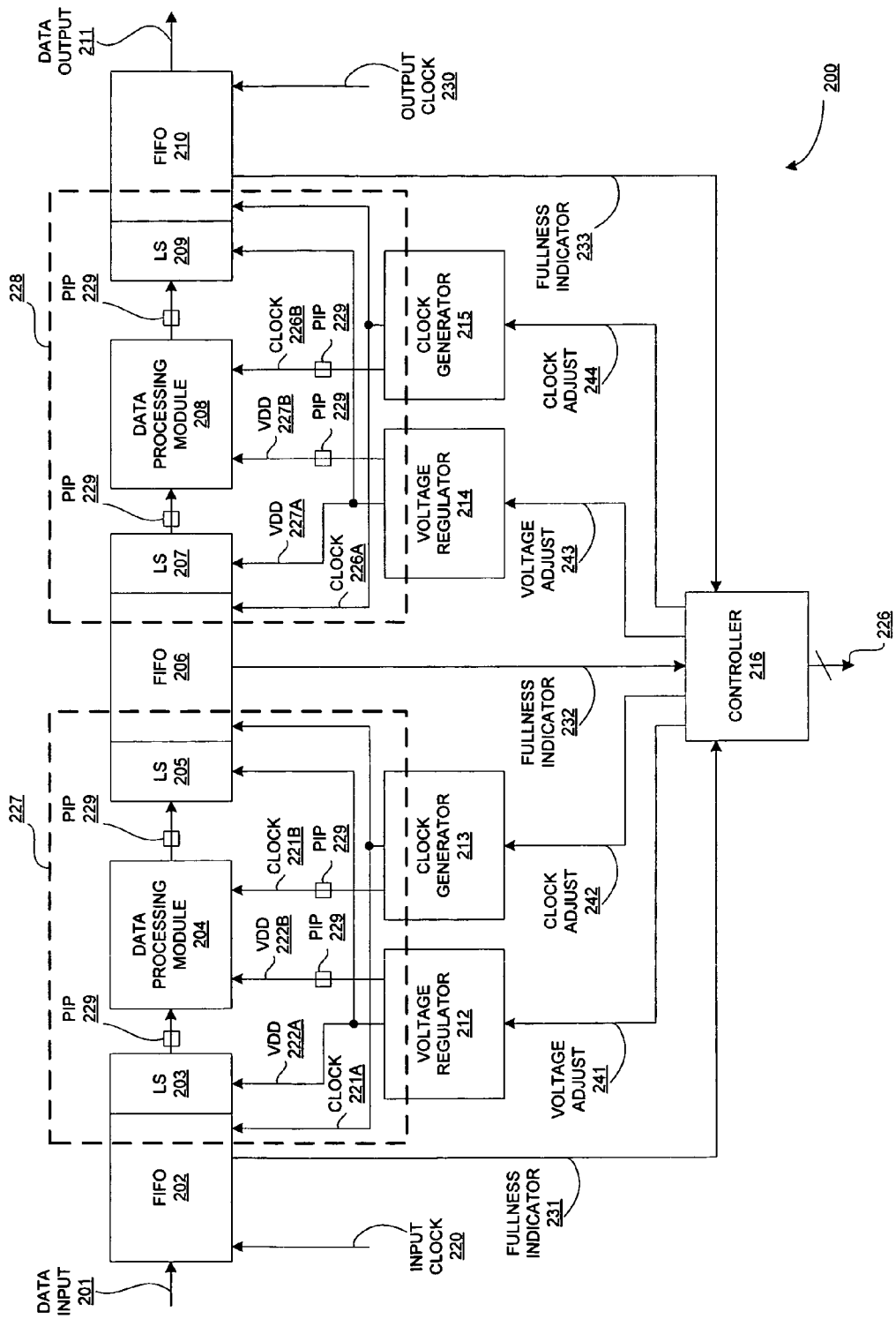
FIG. 2 is a high-level block diagram depicting an exemplary embodiment of a data processing architecture.

FIG. 2 is a high-level block diagram depicting an exemplary embodiment of a data processing architecture 200. Data processing architecture 200 includes an input stage, an interim stage, and an output stage. These stages may be viewed with respect to separate voltage-clock domains ("locally synchronous voltage islands") coupled in series, such as locally synchronous voltage island 227 coupled in series to locally synchronous voltage island 228. It should be understood that many applications involving data processing may involve at least two or more modular processing units. These modular processing units may include one or more processing functions. For example, locally synchronous voltage island 227 may include a data processing module 204 which is different from data processing module 208 of locally synchronous voltage island 228. Thus, data processing modules 204 and 208, although they may have overlapping functions, may have functions which are different from one another. Furthermore, such functional differences may further involve differences in performance targets. By keeping data processing modules 204 and 208 in separate locally synchronous voltage islands, each of such modules may operate independently of one another with respect to various performance-associated parameters. Examples of performance-associated parameters include frequency of operation, latency, bursting, and supply voltage level, among other known performance parameters.

For an application, data processing module 204 may process data using same or different performance parameters than data processing module 208. With respect to having different processing parameters, it should be appreciated that data throughput from data processing module 204 to data processing module 208, such as via at least in part a storage device such as first-in, first-out buffer ("FIFO") 206, is sufficient on average to meet real-time rate targets without loss of data. It should also be appreciated that short-term fluctuations in processing load, should not cause one or more of storage devices, such as FIFOs 202, 206, and 210, to overflow, fill up, or stall data flow such that data is lost. Notably, though an underflow condition may result where one or more of FIFOs 202, 206, or 210 has little or no data, this may be an indication of lost performance though not lost data, and such underflow may be avoided by adjusting one or more performance parameters.

Although the following description is in terms of a PLD or, more particularly, an FPGA, it should be understood that other types of integrated circuits with or without programmably configurable logic may be used. For example, other types of microchips that may be used include Application-Specific Integrated Circuits ("ASICs"), other Application-Specific Standard Products ("ASSPs"), microprocessors, digital signal processors, graphics processors, video processors, and other known integrated circuits employed for processing data that may be implemented having one or more data processing modules. It should be understood that an integrated circuit, such as an FPGA, may only have one data processing module, such as data processing module 204, in which one or more parameters such as one or more of supply voltage or operating frequency are adjusted according to an application-variant condition. However, to clearly describe multiple data processing modules, the example of two data processing modules, such as data processing modules 204 and 208, is used herein. From the description that follows, it shall be appreciated that fewer or more than two data processing modules may be used to adjust performance according to application demands.

It should be understood that each such data processing module may include dedicated or hard-wired logic, as well as programmably configurable logic. Furthermore, a combination of dedicated logic and programmably configurable logic may be within a data processing module. It should be appreciated that a data processing module may include a microprocessor, as well as programmably configured logic coupled to such microprocessor. With respect to an FPGA, there may be an embedded microprocessor or an instantiated microprocessor. Thus it should be appreciated that a data processing module may be realized with a combination of hardware and software. Furthermore, a data processing module may be a software-controlled configuration. Each data processing module may be a data flow process network, where data processing includes conventional processor computation, the use of fixed or programmably configurable circuitry to realize a specific calculation or algorithm, or any combination thereof.

Data input signal 201 is clocked into FIFO 202 responsive to input clock signal 220. Data input signal 201 may include any sequence of data to be processed. A fullness indicator signal 231 is provided from FIFO 202 to controller 216 to provide an indication of how full FIFO 202 is. The fullness indicator may be, for example, a count of the number of items in the FIFO, or a flag indicating whether or not the number of items exceeds some predetermined threshold. Although the description that follows is in terms of FIFOs, it should be appreciated that any storage device capable of buffering data may be used. Though FIFOs in particular provide data in or out sequentially, not all applications process data sequentially, and thus it should be understood that sequential or non-sequential buffering or other temporary storage of data may be used as will vary from application to application.

Notably, the degree to which FIFO 202 is filled or not is a measure of how much performance an application is going to use. Thus, for example, if FIFO 202 is getting full, it may be necessary to increase performance to avoid an overflow condition. Alternatively, if FIFO 202 is getting empty, it may be an indication that performance parameters are set too high and they may be lowered. While this example has been in terms of FIFO 202, it is equally applicable to FIFOs 206 and 210. Accordingly, a fullness indicator signal 232 may be provided from FIFO 206 to controller 216, and a fullness indicator signal 233 may be provided from FIFO 210 to controller 216. While fullness indicator signal 231 indicates performance level of locally synchronous voltage island 227 relative to data input signal 201, fullness indicator signal 233 indicates performance of locally synchronous voltage island 228 relative to data output signal 211. FIFO 210 provides data output signal 211 responsive to output clock signal 230. FIFO 206 is coupled between locally synchronous voltage islands 227 and 228, and thus fullness indicator signal 232 from FIFO 206 provides a relative indication of performance of output from locally synchronous voltage island 227 to input to locally synchronous voltage island 228.

Thus, it should be appreciated that, responsive to fullness indicator signals 231, 232, and 233, which indicate the respective status of FIFOs 202, 206, and 210, controller 216 controls data throughput of data processing architecture 200 to adjust performance of locally synchronous voltage islands 227 and 228. Accordingly, clock adjust signal 242 may be used to increase or decrease the frequency of the output generated by clock generator 213, as determined by controller 216 Similarly, clock adjust signal 244 may be used to adjust the frequency of the output generated by clock generator 215. Moreover, other clock generators may be used, where such other clock generators are responsive to additional control signals, such as clock signals 221 and 226. Notably, clocks 220 and 230 may be synchronous with the input and output domains respectively and thus are not under the control of controller 216.

Responsive to fullness indicator signals 231 and 232, controller 216 may adjust supply voltage level in order to control performance of locally synchronous voltage islands 227 and 228. Voltage adjustment signal 241 may be provided from controller 216 to voltage regulator 212 to control supply voltage 222A provided to level shifters 203 and 205. Voltage regulator 212 may be hardwired to level shifters 203 and 205 to provide such supply voltage level 222A respectively thereto. Additionally, voltage regulator 212 may be coupled to data processing module 204 via programmable interconnect point ("PIP") 229 to provide supply voltage 222B to data processing module 204. Notably, PIPs 229 are shown as being outside of data processing modules 204 and 208; however, such PIPs 229 may be considered as being implemented in FPGA programmable fabric and thus such PIPs 229 may be considered as being within such data processing modules 204 and 208. As PIPs are well known, they are not described herein in unnecessary detail for purposes of clarity.

Level shifter 203 is coupled to an output of FIFO 202 to receive input data from data input signal 201 stored in FIFO 202. Level shifter 203 may be coupled to data processing module 204 via another PIP 229. Although PIPs 229 have been shown for coupling data processing modules 204 and 208 to respective sets of level shifters, voltage regulators, and clock generators, it should be appreciated that one or more dedicated connections may be used. This is particularly appropriate for devices not having PIPs.

Responsive to supply voltage level signal 222A, level shifter 203 shifts the voltage level of data output from FIFO 202 for input to data processing module 204. Notably, data is clocked out of FIFO 202 responsive to frequency of clock signal 221A.

Responsive to one or more fullness indicator signals 231 and 232, controller 216 may provide a clock adjust signal 242 to clock generator 213 to adjust frequency of operation of locally synchronous voltage island 227. Thus, clock generator 213 may provide clock signal 221A to clock output from FIFO 202 and input to FIFO 206. Furthermore, clock generator 213 may be coupled to data processing module 204 via PIP 229 to provide data processing module 204 with clock signal 221B. Notably, clock signals 221B and 221A may be the same or different signals. Additionally, it should be understood that clock generator 213, as well as clock generator 215 associated with locally synchronous voltage island 228, may be programmable or otherwise variable to adjust frequency. However, for purposes of clarity it shall be assumed that locally synchronous voltage island 227 is operated with respect to a clock signal having a same frequency, though phase relationship may be different, and thus it shall be assumed that clock signals 221A and 221B operate at the same frequency.

Again, clock signal 221A is used to clock input data out of FIFO 202. Such input data is provided to level shifter 203 which adjusts level of such input data responsive to supply voltage signal 222A provided to data processing module 204. Data processing module 204 operates with a supply voltage level 222B and a clock frequency of clock signal 221B to provide an output. The output from data processing module 204 may be provided to level shifter 205, and data processing module 204 may be coupled to level shifter 205 via PIP 229. Level shifter 205, receiving the input data as processed by data processing module 204, namely interim data, provides such interim data to an input port of FIFO 206. The interim data provided from level shifter 205 is adjusted in level responsive to supply voltage level signal 222A and is clocked into FIFO 206 responsive to frequency of clock signal 221A.

Again, it should be appreciated that throughput of FIFO 206 may be controlled in part by controller 216 setting frequency of clock signal 221A. Notably, data processing module 204 may not have a steady state throughput such that frequency of clock signal 221A would be the same for FIFO 202 and FIFO 206. However, again for purposes of clarity, it shall be assumed that locally synchronous voltage island 227 operates at a single clock frequency for this exemplary implementation. However, it should be appreciated that independent clock signal paths may be provided from clock generator 213 to level shifter 203, data processing module 204, and level shifter 205 to provide signals having different frequencies or phases, or some combination thereof, to each of these blocks of circuitry, in order to ensure providing data throughput within some target range for avoiding either an overflow or underflow condition.

Interim data clocked into FIFO 206 responsive to frequency of clock signal 221A may be clocked out of FIFO 206 responsive to frequency of clock signal 226A. Much of the description of locally synchronous voltage island 228 is the same as locally synchronous voltage island 227, as well as is the description of associated circuitry. For purposes of clarity, such description is not repeated.

Controller 216, responsive to fullness indicator signals 232 and 233 from rIFOs 206 and 210 respectively; provides voltage adjust signal 243 to voltage regulator 214 and clock adjust signal 244 to clock generator 215. Output of voltage regulator 214 is supply voltage level signal 227A, which is provided to level shifters 207 and 209, as well as a supply voltage level signal 227B, which is provided to data processing module 208 via PIP 229. Clock generator 215 provides clock signal 226A with a frequency responsive to clock adjust signal 244. Clock signal 226A is provided to an output clock port of FIFO 206 and an input clock port of FIFO 210. Additionally, a clock signal 226B is provided to data processing module 208 from clock generator 215 via PIP 229.

Interim data stored in FIFO 206 may be clocked out responsive to frequency of clock signal 226A for input to level shifter 207. Level shifter 207 adjusts level of such interim data responsive to supply voltage level signal 227A for providing to data processing module 208 via PIP 229. Data processing module 208 processes such interim data with performance parameters which are set responsive to voltage adjust signal 243 and clock adjust signal 244 via supply voltage level signal 227B and frequency of clock signal 226B, respectively. After processing interim data, data processing module 208 provides such processed interim data to level shifter 209 via PIP 229. Level shifter 209 adjusts voltage level of such processed interim data responsive to supply voltage level signal 227A to provide output data. Such output data is provided from level shifter 209 to FIFO 210 or, more particularly, is clocked into FIFO 210 responsive to frequency of clock signal 226A. Such output data may be clocked out of FIFO 210 responsive to output clock signal 230 to provide data output signal 211.

It should be appreciated that controller 216 may be implemented using any of a variety of known technologies. Moreover, controller 216 may be configured in programmably configurable logic. Examples of control strategies include one or more finite state machines to indicate the state of each of FIFOs 202, 206, and 210. In this embodiment, fullness indicator signals 231, 232, and 233 may be flags input to controller 216. Examples of such flags may be fixed at particular values or may be programmably adjustable. For example, a flag may be set to indicate 10% of full, and another flag may be set to indicate 90% of full. Alternatively, such flags may be set for relative fullness of the FIFOs at levels of high, medium high, medium, medium low, and low. Another example of controller 216 may be implemented with fuzzy logic. For example, fullness indicator signals 231, 232, and 233 may be provided from FIFOs to indicate that the FIFO is "getting full" or "getting empty." Another example of an implementation for controller 216 may be to use a proportional integral differential ("PID") digital controller. Such a controller could sum up the proportional, integral, and differential signals each weighted by an associated constant. Notably, as PID digital controllers are well known, they are not described herein in unnecessary detail for purposes of clarity.

The particular choice of control strategy implemented in controller 216 depends on the particular characteristics of the application being programmed, and thus may vary from application-to-application.

Figure 3:
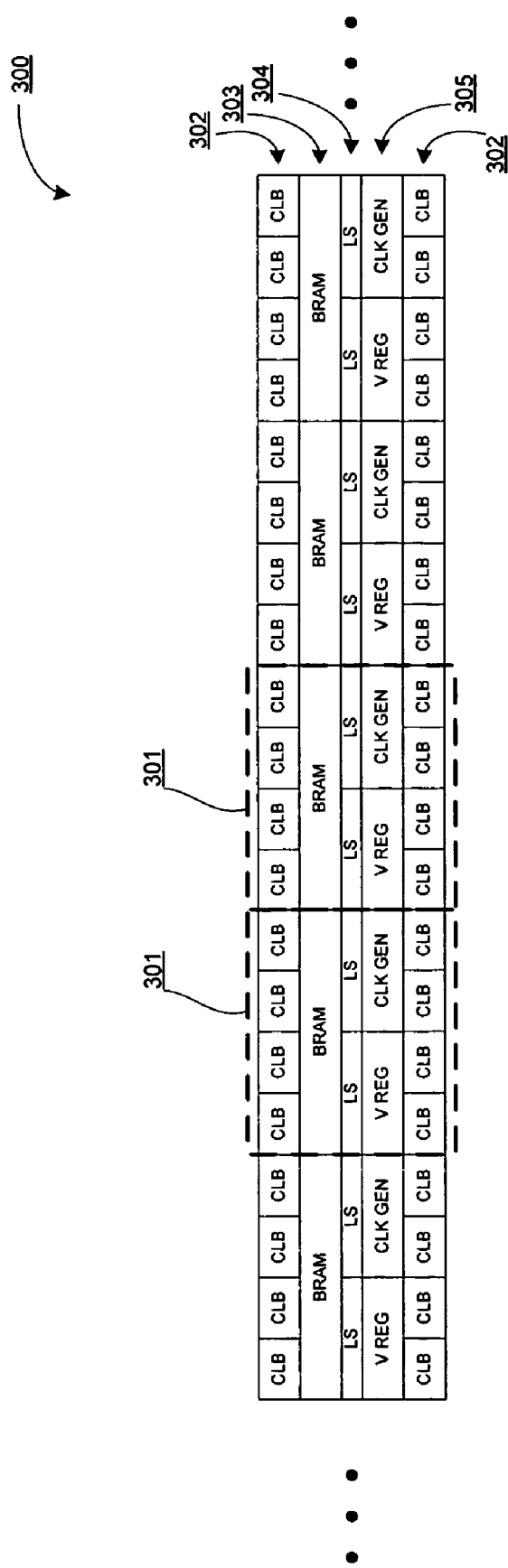
FIG. 3 is a high-level block diagram depicting an exemplary embodiment of a portion of an FPGA.

FIG. 3 is a high-level block diagram depicting an exemplary embodiment of a portion 300 of an FPGA. Portion 300 includes rows 302 of CLBs bracketing rows 303, 304, and 305. Row 303 may be a row of BRAMs. Each BRAM in the row of BRAMs may be configured as a FIFO. Adjacent to row 303 may be a row 304 of level shifters. For each BRAM in 303 there may associated therewith two level shifters for providing at least one of an input and an output level shifter. Such level shifters in row 304 may be programmably coupled to BRAMs in row 303. Additionally, a row 305 of pairs of voltage regulators and clock generators may be next to row 304.

Embedded blocks of circuitry for a voltage regulator and a clock generator, as well as level shifters, may be programmably coupled to provide a locally synchronous voltage island, as described with reference to FIG. 2. Furthermore, one or more CLBs of one or more of rows 302 may be configured to provide a data processing module, or may be coupled to other fixed or programmably configurable logic to provide such data processing module. Accordingly, it should be appreciated that blocks 301 formed of rows 302 through 305 may be serially coupled to provide a sequence of data processing modules delimited by FIFOs, which may include an input FIFO at one end and an output FIFO at the other end. Furthermore, input and output FIFOs may be disposed at the perimeter of the array of programmably configurable logic. Additionally, a clock distribution network may extend to portion 300 to allow each block 301 to be separately clocked. In an implementation clock and voltage generator pairs in row 305 may span more than one BRAM or more than four CLBs, and thus it should be understood that the ratios of circuitry blocks in FIG. 3 may vary from implementation to implementation.

The foregoing description is applicable to any of a number of systems having one or more data processing modules. An example of such a system having data-dependent and time-variant computational parameters is any known video compression algorithm, such as MPEG-4, for example. Furthermore, systems dealing with data transfer across voltage or clock domains may be facilitated by sensing of throughput and adjusting of performance responsive to such sensing. Additionally, in mobile computing environments, performance may be reduced to conserve power where available and then increased based on system data throughput operating parameters.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. For example, though feedback regarding state of FIFOs is described generally in state of fullness, it should be understood that state of emptiness is equivalent. Furthermore, it should be appreciated that clock signals 220 and 230 of FIG. 2 may be synchronous or asynchronous with respect to one another. Additionally, it has been assumed that a peak voltage is a starting voltage supply level from which performance may be retarded. However, supply voltage may be increased over a standard fixed level, as described in additional detail in U.S. Pat. No. 5,574,634 B1. Moreover, though level shifters are shown separate from FIFOs, it should be understood that a level-shifting buffer may be used. Claim(s) listing steps do not imply any order of the steps. Trademarks are the property of their respective owners.

What is claimed is:

1. In an integrated circuit, a system for dynamically adjusting performance of circuitry blocks, the system comprising:
    a first circuit domain;
    an interim storage device coupled to the first circuit domain;
    the first circuit domain including:
        a first level shifter coupled to an input of a first circuitry block; and
        a second level shifter coupled to an output of the first circuitry block, the second level shifter coupled between the output of the first circuitry block and an input of the interim storage device;
    a controller coupled to the first circuit domain for adjustment of a first operating voltage of the first circuit domain;
    a second circuit domain coupled to the first circuit domain via the interim storage device, the controller being coupled to the second circuit domain for adjustment of a second operating voltage of the second circuit domain, the second circuit domain including:
        a third level shifter coupled to an input of a second circuitry block;
        the third level shifter coupled between an output of the interim storage device and the input of the second circuitry block; and
    a fourth level shifter coupled to an output of the second circuitry block; an input storage device having an output coupled to an input of the first level shifter; and
        an output storage device having an input coupled to an output of the fourth level shifter, each of the input storage device, the interim storage device, and the output storage device configured to sequentially store data provided respectively thereto, wherein:
        the input storage device is coupled to receive input data, the input storage device configured to provide the input data to the first level shifter at a first frequency for the first circuitry block, the first circuitry block operated responsive to the first frequency, the input data after processing by the first circuitry block being provided to the interim storage device via the second level shifter as interim data and being clocked into the interim storage device as the interim data at the first frequency; and
        the interim data stored in the interim storage device is provided via the third level shifter to the second circuitry block, the interim data stored in the interim storage device being clocked out at a second frequency, the second circuitry block operated responsive to the second frequency, the interim data after processing by the second circuitry block being provided to the output storage device via the fourth level shifter as output data and being clocked into the output storage device as the output data at the second frequency.

2. The system according to claim 1, wherein the first circuit domain is operated synchronously responsive to the first frequency; and wherein the second circuit domain is operated synchronously responsive to the second frequency.

3. The system according to claim 2, wherein the first circuit domain and the second circuit domain are operated asynchronously with respect to one another.

4. The system according to claim 3, wherein the first frequency and the second frequency are different.

5. The system according to claim 1, further comprising:
    a first voltage regulator coupled to the first level shifter, the first circuitry block, the controller, and the second level shifter to provide each with a first supply voltage level for the first operating voltage; and
    a second voltage regulator coupled to the third level shifter, the second circuitry block, the controller, and the fourth level shifter to provide each with a second supply voltage level for the second operating voltage.

6. The system according to claim 5, wherein the first supply voltage level is different from the second supply voltage level.

7. The system according to claim 5, further comprising:
    a first clock generator coupled to the input storage device, the first circuitry block, and the interim storage device to provide each with a first clock signal with the first frequency; and
    a second clock generator coupled to the interim storage device, the second circuitry block, and the output storage device to provide each with a second clock signal with the second frequency.

8. The system according to claim 7, wherein:
    at least a portion of each of the input storage device and the interim storage device associated with the first frequency is part of the first circuit domain;
    at least a portion of the each of the interim storage device and the output storage device associated with the second frequency is part of the second circuit domain;
    at least a portion of the first voltage regulator associated with the first supply voltage level is part of the first circuit domain;
    at least a portion of the second voltage regulator associated with the second supply voltage level is part of the second circuit domain;
    at least a portion of the first clock generator associated with the first clock signal is part of the first circuit domain; and
    at least a portion of the second clock generator associated with the second clock signal is part of the second circuit domain.

9. The system according to claim 7, wherein the controller is coupled to the input storage device, the interim storage device, and the output storage device to receive respective indications of fullness from each, the controller configured to cause the first voltage regulator and the second voltage regulator to respectively adjust the first supply voltage level and the second supply voltage level responsive to the indications of fullness.

10. The system according to claim 9, wherein the controller is coupled to the first clock generator and the second clock generator, the controller configured to cause the first clock generator and the second clock generator to respectively adjust the first frequency of the first clock signal and the second frequency of the second clock signal responsive to the indications of fullness.

11. The system according to claim 10, wherein:
    the input storage device is coupled to receive the input data and an input clock, the input storage device configured to clock in the input data responsive to the input clock, the input clock having a third frequency; and the output storage device is coupled to receive an output clock, the output storage device configured to clock out the output data responsive to the output clock, the output clock having a fourth frequency.

12. The system according to claim 11, wherein the third frequency is different from the first frequency; and wherein the fourth frequency is different from the second frequency.

13. The system according to claim 11, wherein the first circuitry block is coupled to the first level shifter, the second level shifter, the first voltage regulator, and the first clock generator via respective first programmable interconnects; and wherein the second circuitry block is coupled to the third level shifter, the fourth level shifter, the second voltage regulator, and the second clock generator via respective second programmable interconnects.

14. The system according to claim 13, wherein the input storage device, the interim storage device, and the output storage device are respective first-in, first-out buffer memories.

15. The system according to claim 14, wherein the respective first-in, first-out buffer memories are each configured from block random access memories.

16. The system according to claim 15, wherein the integrated circuit is a programmable logic device.

* * * * *